United States Patent
Baik et al.

(10) Patent No.: US 6,529,219 B1
(45) Date of Patent: Mar. 4, 2003

(54) COMPUTER USER INTERFACE FOR EXECUTING AND CONTROLLING AN APPLICATION PROGRAM USING PROGRAM SELECTION SMARTS BUTTONS

(75) Inventors: Sung-Shik Baik, Kyunggi-do (KR); Han-Suk Kim, Kyunggi-do (KR); Kwang-Chul Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/419,776

(22) Filed: Oct. 18, 1999

(30) Foreign Application Priority Data

Oct. 16, 1998 (KR) .............................. 98-43761

(51) Int. Cl.[7] .............................................. G06F 3/023
(52) U.S. Cl. ...................................... 345/827; 345/835
(58) Field of Search ................................ 345/700, 716, 345/721, 727, 764, 779, 781, 783, 810, 817–821, 823, 827, 835, 839–841, 854, 156, 168, 172; 708/139, 142, 145, 146; 710/67; 341/22

(56) References Cited

U.S. PATENT DOCUMENTS

| | | | | |
|---|---|---|---|---|
| 4,862,389 A | * | 8/1989 | Takagi | 345/794 |
| 4,896,290 A | * | 1/1990 | Rhodes et al. | 345/168 |
| 5,497,455 A | | 3/1996 | Suga et al. | 345/835 |
| 5,525,978 A | * | 6/1996 | York et al. | 341/22 |
| 5,699,534 A | | 12/1997 | Barber et al. | 345/856 |
| 5,717,430 A | * | 2/1998 | Copland et al. | 341/22 |
| 5,721,850 A | * | 2/1998 | Farry et al. | 345/810 |
| 5,881,318 A | * | 3/1999 | Liebenow | 710/67 |
| 5,923,866 A | * | 7/1999 | Chen | 703/21 |
| 5,948,084 A | | 9/1999 | Ha | 710/73 |
| 5,986,586 A | * | 11/1999 | Tsai | 341/22 |
| 6,011,495 A | * | 1/2000 | Chen | 341/22 |
| 6,118,450 A | * | 9/2000 | Proehl et al. | 345/810 |

\* cited by examiner

*Primary Examiner*—Crescelle N. dela Torre
(74) *Attorney, Agent, or Firm*—Robert E. Bushnell, Esq.

(57) ABSTRACT

A computer user interface of this invention is a special interface for executing an application program, and includes a program selection button and a shell program for executing an application program corresponding to a press of the program shell button. A user can select and execute an application program registered in the shell program by means of the program selection button. In particular, the user can register an application program which can be selected by the program selection button in a program shell, thereby enabling a using environment to be fitted for the user. Since an audio player can be easily controlled by the program selection button, the user need not perform vexatious input steps for controlling the audio player using a keyboard device or a mouse.

14 Claims, 9 Drawing Sheets

Fig. 9

| Track | Title | Length |
|---|---|---|
| 28. | Ocean Gipsy-Renaissance.RA | |
| 29. | Ashes Are Burning-Renaissance.RA | |
| 30. | On The Frontier-Renaissance.RA | |
| 31. | Let It Grow-Renaissance.RA | |
| 32. | Working Hour-Tears For Fears.RA | |
| 33. | Shout-Tears For Fears.RA | |
| 34. | I Believe-Tears For Fears.RA | |
| 35. | Head Over Heels-Tears For Fears.RA | |
| 36. | Woman In Chains-Tears For Fears.RA | |
| 37. | Manic Monday-Bangles.RA | |
| 38. | Walk Like An Egyptian-Bangles.RA | |
| 39. | I'm Your Man-WHAM!.RA | |
| 40. | Freedom-WHAM!.RA | |
| 41. | Kissing A Fool-George Michael.RA | |
| 42. | Crazy For You-Madonna.RA | |
| 43. | Into The Groove-Madonna.RA | |
| 44. | Take A Bow-Madonna.RA | |
| 45. | Mad About You-Belinda Carlisle.RA | |
| 46. | Circle In The Sand-Belinda Carlisle.RA | |

COMPUTER USER INTERFACE FOR EXECUTING AND CONTROLLING AN APPLICATION PROGRAM USING PROGRAM SELECTION SMARTS BUTTONS

CLAIM OF PRIORITY

This application makes reference to, incorporates the same herein, and claims all benefits accruing under 35 U.S.C §119 from an application entitled Computer User Interface earlier filed in the Korean Industrial Property Office on Oct. 16, 1998, and there duly assigned Ser. No. 98-43761 by that Office.

BACKGROUND OF THE INVENTION

1. Field of the Invention

The present invention relates to a computer system and, more particularly, to a computer user interface.

2. Background of the Invention

As semiconductor technology has been developed, a computer system has been conspicuously developed from the beginning. Additionally, a user interface technique of a computer system has been developed. There are various system operating methods in accordance with an operating system installed in a computer system and a user interface mode supported by an application program.

FIG. 1 illustrates an example of a conventional portable computer. Referring to FIG. 1, a conventional portable computer 10 comprises a computer body 12 and a display panel 11 hinge-combined with the body 12. The computer body 12 includes a keyboard device 11 and a pointing device 14. Accordingly, user interface devices of the computer system 10 are the keyboard device 13 and a pointing device 14.

A current operating system installed in a computer system mainly takes up a GUI (graphic user interface) mode. For example, a known operating system takes up two methods to execute an application program, as follows:

(1) A user selects an icon by means of a keyboard device and a pointing device, so that an application program is executed; and (2) A user selects an application program by means of a widows explorer, so that the application is executed.

Since this operating system adopting the GUI mode can basically display icons corresponding to each application program on a screen, a user can conveniently execute the corresponding application program. Various ways of executing, or launching, an application program are depicted by U.S. Pat. No. 5,497,455 to Masao Suga et al. entitled Portable Computer Which Has A Task Selection Menu Allowing Easy Selection And Execution Of Arbitraiy Application Software Without Entering A Command; U.S. Pat. No. 5,699,534 to Ronald Jason Barber et al. entitled Multiple Display Pointers For Computer Graphical User Intetfaces; and U.S. Pat. No. 5,948,084 to Ho Jin Ha entitled System For Remotely Controlling A Computer Having A User Intetface Software Communication With A Device Driver And Driving An Application Software To Perform Operation Based On A Combined Key Signal.

When a large number of application programs are installed in a computer system, a user's desktop becomes busy and cluttered with multiple icons. A user can set a computer system lest an icon corresponding to an application program be displayed on a screen. However, this makes it very vexatious for a novice user to select and execute the application program by means of a keyboard device or a pointing device one by one.

In order to remedy the foregoing drawback, a current computer system is mounted with a so-called "easy button" for convenient execution of a specific program. Easy buttons are located on the outside of a computer body, so that an application program can be conveniently executed when a user only presses the button. In a computer system having a remote control function, the easy buttons may be mounted upon a remote control device. Since each of the easy buttons corresponds to a specific program, the corresponding program can be executed and ended by means of the easy buttons.

The number of the easy buttons is quite limited in spite of the convenience. Since computer system makers set the corresponding relation between easy buttons and application programs, a user cannot change the relation. Although the easy buttons corresponding to the application programs can be mounted on a computer system as many as possible, these buttons lead to inconvenience and inefficiency.

SUMMARY OF THE INVENTION

It is therefore an object of the present invention is to provide computer user interface which can conveniently drive an application program installed in a computer system.

A computer user interface of this invention includes input means, conversion means, and executing means. The input means including a plurality of input buttons is aimed at executing a designed application program installed in the computer system by pressing the buttons. The conversion means is aimed at sensing an input of the input means and then converting the input into a predetermined scan code, thereby inputting the input into the computer system. The executing means is aimed at executing the designated application program in response to the input.

In the foregoing computer user interface, the input means includes first, second, and third buttons. The first and the second buttons are aimed at selecting an application program. The third button is aimed at commanding the selected application program to be executed.

In the foregoing computer user interface, the executing means includes as follows:

input decision means for sensing that the conversion means outputs a scan code in response to the input of the input means, thereby outputting data corresponding to the input scan code; and means for receiving the data from the input decision means and, thereby, executing the application program being installed in the computer system.

Herein, the means for receiving has a first operation mode for executing an application program being designated by the input means and a second operation mode being able to select a menu of the application by mean of the input means.

Herein, the means for receiving includes as follows:

a program selector for executing an application program being selected in the first operation mode; and means for supplying a message to the program selector in the first operation mode and supplying a message to an application program in the second operation mode, the message corresponding to data being input from the input decision means.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein:

FIG. 9 illustrates an example of an audio album subwindow of an audio player.

DETAILED DESCRIPTION OF PREFERRED EMBODIMENTS

A computer user interface of the present invention is a special interface for executing application programs, and includes program selection buttons and shell programs executing an application program in response to a press of a program selection button. A user can select and execute an application program registered in the shell program by means of the program selection button.

Figure 1:
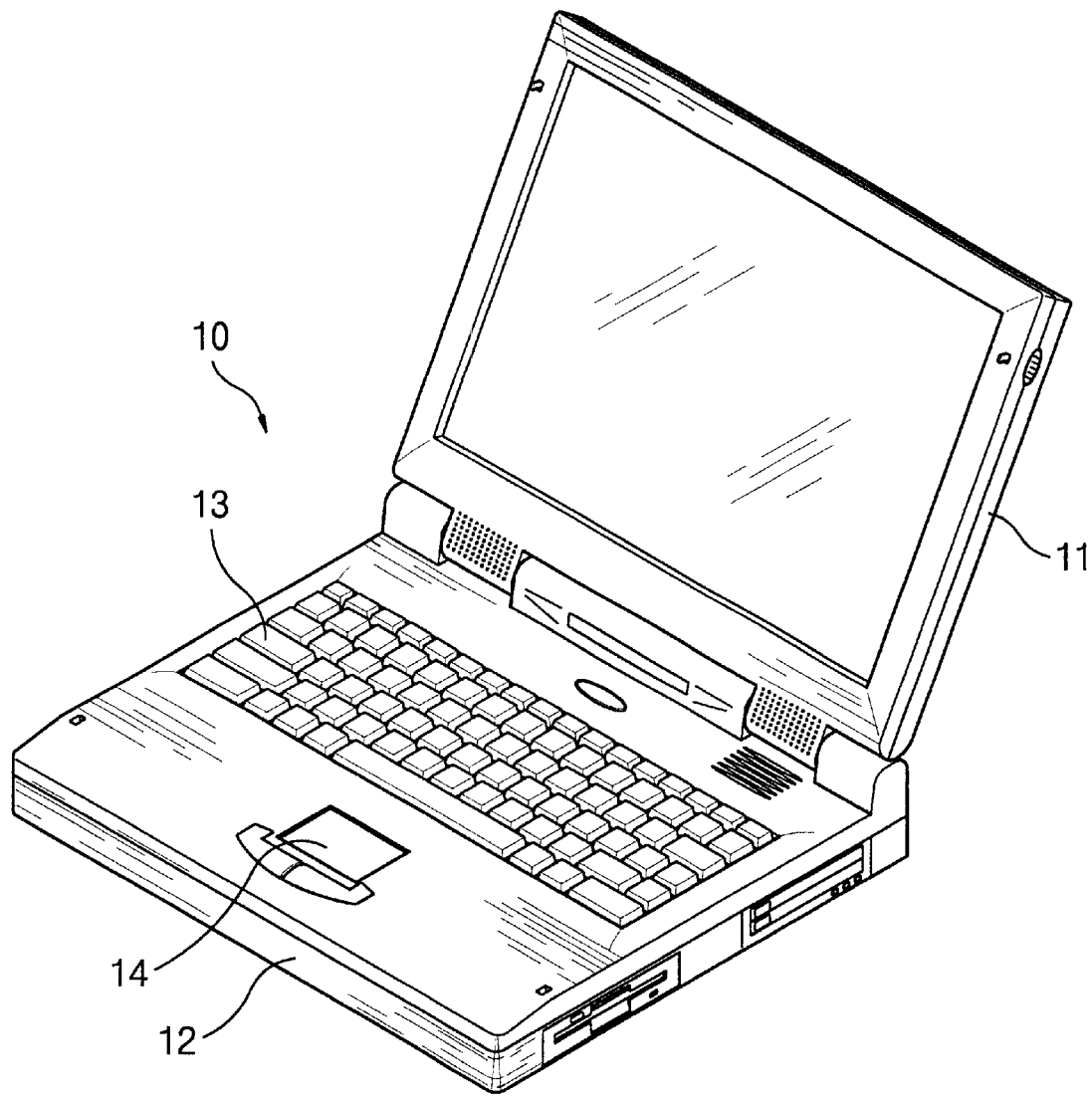
FIG. 1 is a perspective view showing an example of a conventional portable computer.
Figure 2:
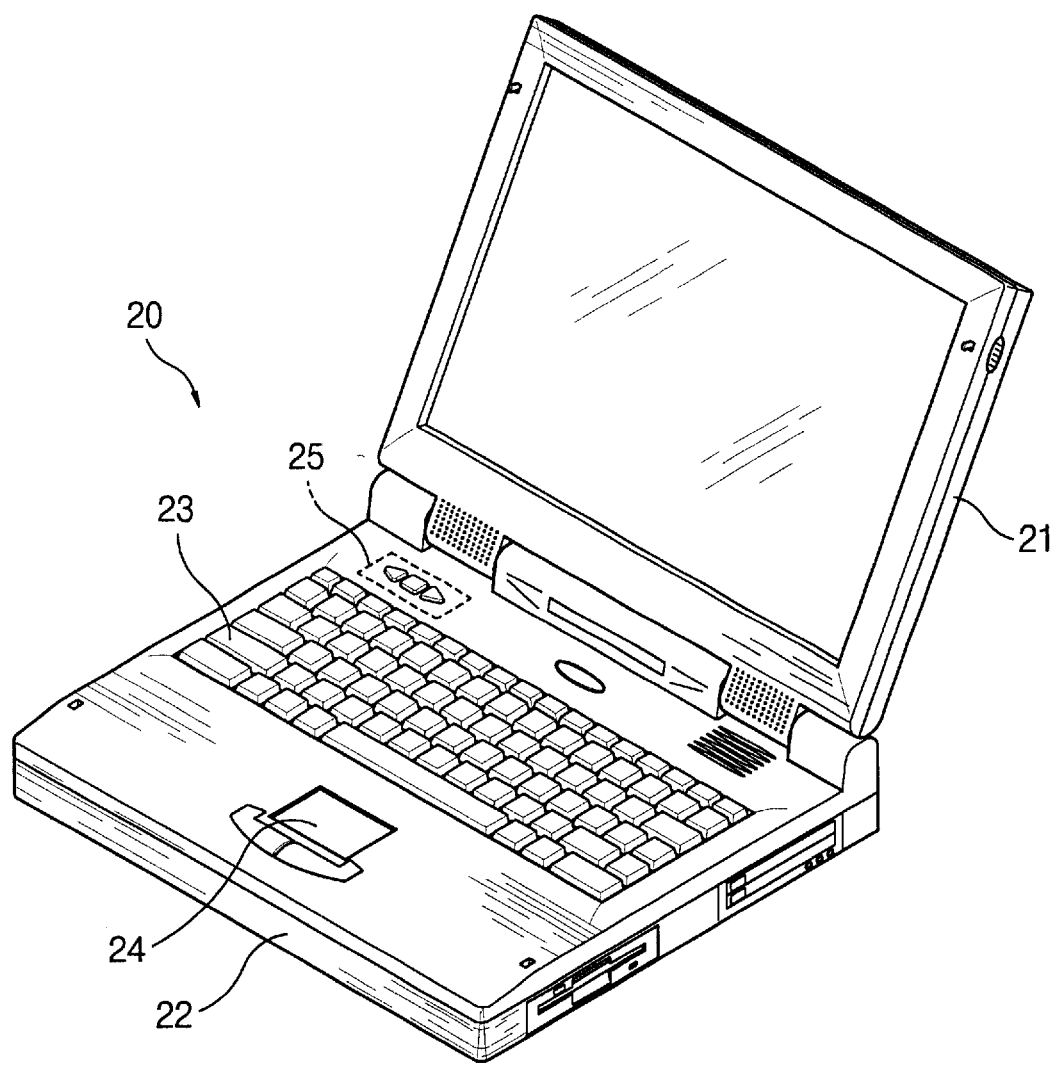
FIG. 2 is a perspective view showing an example of a portable computer according to an embodiment of the invention.

FIG. 2 illustrates an example of a portable computer according to an embodiment of the invention. Referring to FIG. 2, a portable computer system 20 of this invention comprises a body 22 and a display panel 21 hinge-connected to the body 21. A keyboard device 23, a pointing device 24, and program selection smarts buttons 25 are mounted upon the body 21. A known operating system is installed in the portable computer system 20.

Figure 3:
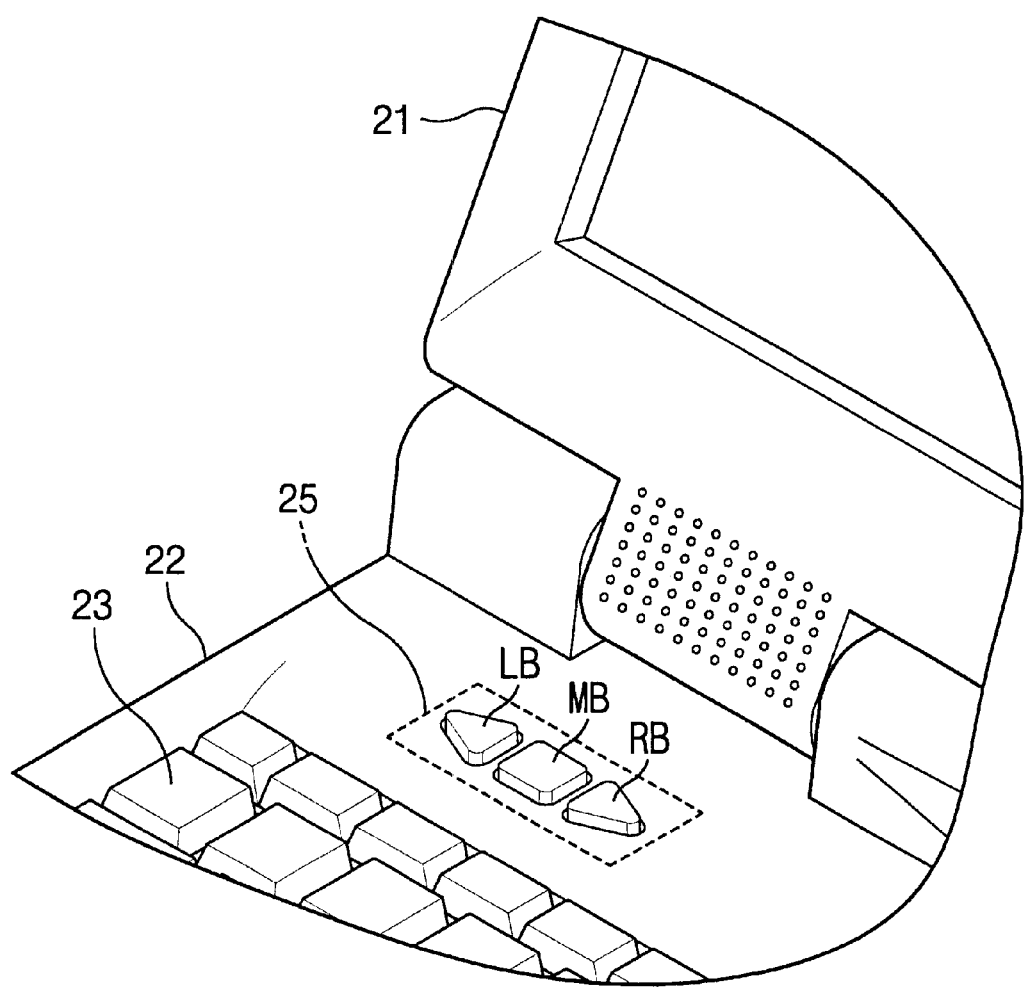
FIG. 3 is an enlarged perspective view showing smarts buttons shown in FIG. 2.

FIG. 3 illustrates enlarged smarts buttons shown in FIG. 2. Referring to FIG. 3, program selection smarts buttons 25 comprise a left button LB, a middle button MB, and a right button RB.

Basically, a user uses the smart buttons 25 so as to select and execute a program. That is, the left button LB and the right button RB are used so as to select an application program and the middle button MB is used so as to execute the application program. The smart buttons 25 are further used so as to select a menu of an application program supporting the smart buttons 25 and execute the selected menu. The user can conveniently execute an application program by means of the smart buttons 25.

Figure 4:
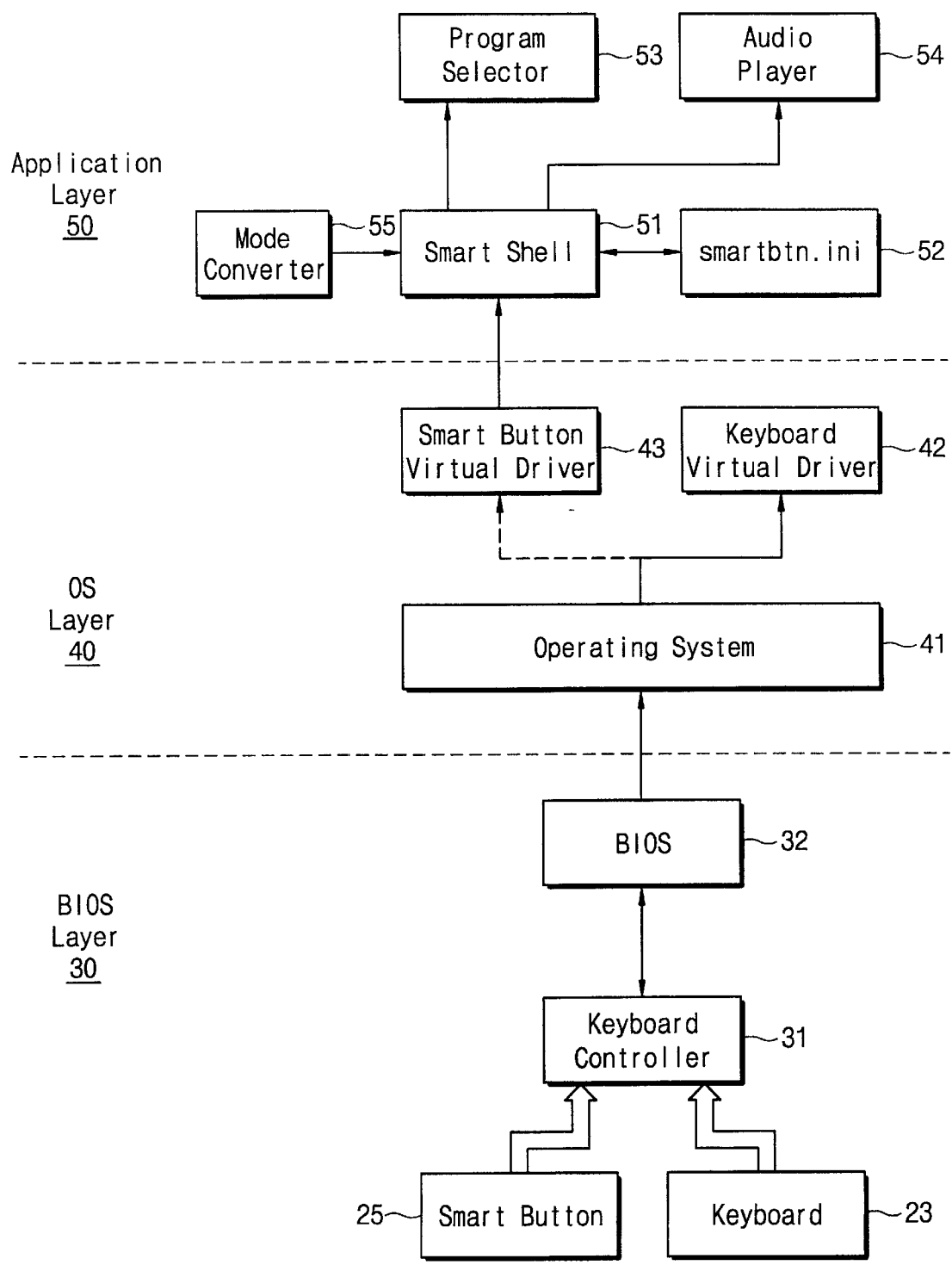
FIG. 4 is a block diagram for depicting a system layer of a computer system shown in FIG. 2.

FIG. 4 illustrates a system layer of a computer system shown in FIG. 2 having a BIOS (basic input/output system) layer 30, OS (operating system) layer 40 and an application layer 50. Referring to FIG. 4, a keyboard controller 31 determines whether a key is input from the smart buttons 25 and the keyboard device 23. If input, a corresponding interrupt is created to output a corresponding key scan code. According to the creation of the interrupt, an interrupt routine for a corresponding key input processing is executed by BIOS 32. According to execution of the corresponding interrupt routine, an operating system 41 receives key input data. Key scan codes created in response to a press of the smart buttons 25, as shown in TABLE 1, are not used in any current keyboard device 1.

TABLE 1

| BUTTON | KEY SCAN CODE | |
|---|---|---|
| | MAKE DATA | BREAK DATA |
| left button LB | 75h | F5h |
| middle button MB | 76h | F6h |
| right button RB | 77h | F7h |

When the smart buttons 25 are pressed, each of the key scan codes corresponding to the smart buttons 25 are created, as shown in TABLE 1. If a user presses only one key of a keyboard device during a predetermined time, the key input data is repeatedly input. This is called "typematic function". Herein, "typematic rate" is a cycle that the key input is repeated during the predetermined time and "typematic delay" is a waiting time until the typematic function is started. Setting time of the typematic rate is 600 msec and that of the type delay is 90 msec.

When a key is input from the keyboard device 23, a keyboard virtual driver 42 receives key input data through an operating system 41. When a key is input from the smart buttons 25, a smart button virtual driver 43 receives key input data through the operating system 41. The smart virtual driver 43 determines whether current key input data is input by the keyboard device 23 or the smart buttons 25. If by the smart buttons 25, the smart virtual driver 43 supplies the key input data to a smart shell 51. The smart shell 51, which is a shell program for input processing of the smart buttons 25, receives key input data created by pressing the smart buttons 25 and then supplies a message corresponding to a current mode to a program selector 53 or a corresponding application program. For example, the application program may be an audio player 54. A mode of smart shell 51 can be changed by means of a special mode converter 55. When smart shell 51 is driven it is initialized by referring to an initializing file "smartbtn.ini" 52. The program selector 53 (which will be described in detail afterwards) has a function to execute one program selected from a group consisting of application programs registered in a smart shell window of FIG. 6A.

Figure 5:
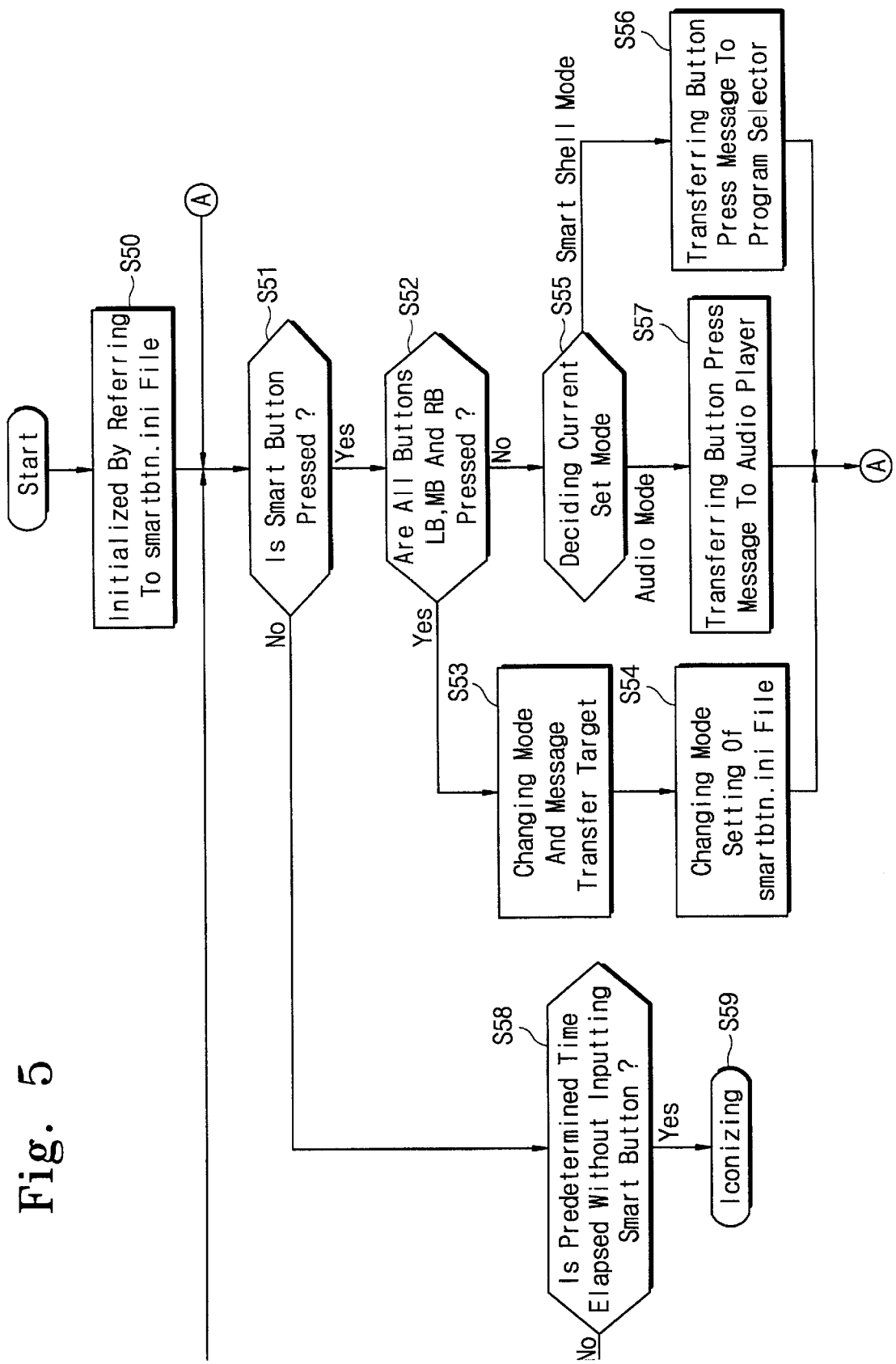
FIG. 5 is a flow chart showing the steps of operating a smart shell shown in FIG. 4.
Figure 6A:
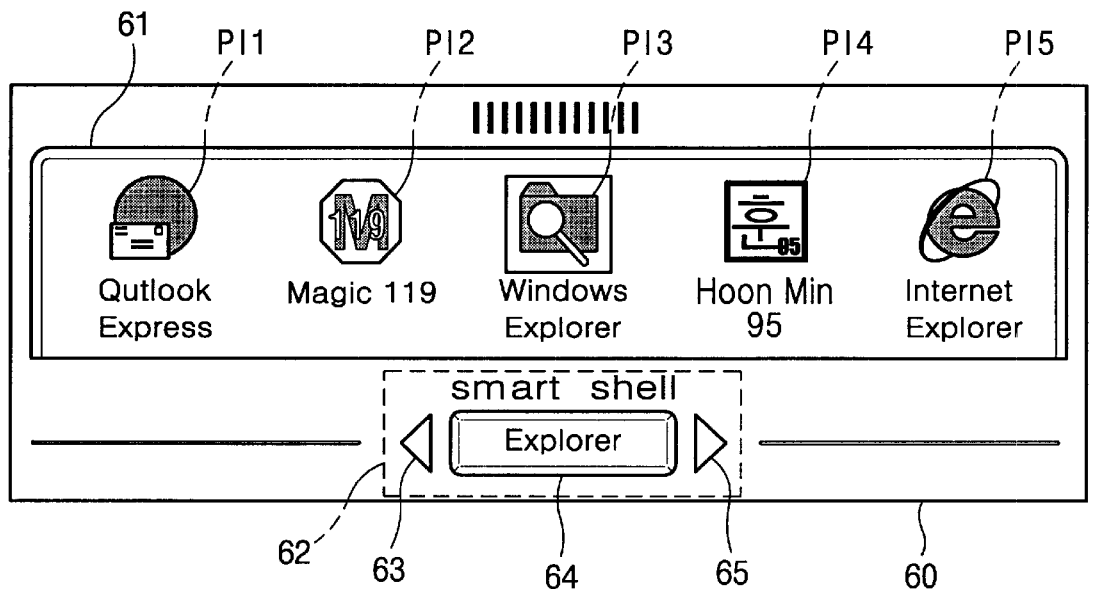
FIGS. 6A–6B illustrate a smart shell window for computer user interface.
Figure 6B:
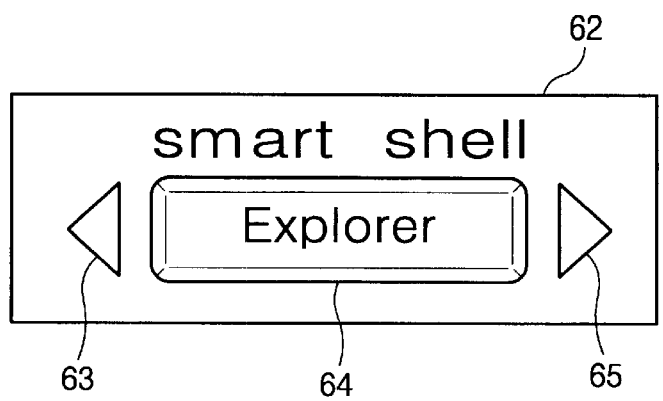

FIG. 5 is a flow chart showing the steps of operating smart shell shown 51 in FIG. 4, and FIGS. 6A–6B illustrate a smart shell window for a computer user interface. Referring to FIG. 5, when a smart shell 51 is driven, in step S50, it is initialized by referring to an initializing file "smartbtn.ini" 52. In this initializing step, as shown in FIG. 6A, a smart shell window 60 for a user interface is displayed on a screen of a display panel 21. The smart shell window 60 has two display areas. One is a program icon display area 61 and the other is a smart button input display area 62. If the smart shell window 60 is minimized, only the smart button input display area 62 is displayed, as shown in FIG. 6B.

Icons PI1–PI5 of application programs registered in a current smart shell are displayed in the program icon display area 61. An input status of the smart buttons 25 is displayed in the smart button input display area 62 and wherein buttons LB, MB, and RB correspond to reference numbers 63, 64, and 65, respectively. A program name of a current selected application program is briefly displayed in a display area of the middle button MB 64. By way of an example, in FIG. 6B the display area of the middle button MB 64 is displayed as "Explorer". The current selected application program is an application program located in the middle of the program icon display area 61.

In step S51, the smart shell 51 determines whether there is a press of the smart buttons 25. If there is the press, the step S51 proceeds to a step S52. In step S52, the invention determines whether the press is a button press for mode conversion. For example, if a user inputs all the keys LB, MB, and RB of the smart buttons 25, it is decided to require converting a mode. In this case, the step S52 proceeds to a step S53. In step S53, a mode is converted to change a message transfer target and mode setting of the file "smart-btn.ini" 52. In this embodiment, the smart shell 51 has two kinds of operation modes. One is a "smart shell mode" which can execute an application program by means of the smart buttons 25. The other is, for example, an "audio mode" which can operate an audio player 54 by means of the smart buttons 25.

If the press is not a button press for mode conversion in step S52, the step S52 proceeds to a step S55. In step S55, the invention decides a current set mode. If the mode is set to the smart shell mode, the step S55 proceeds to a step S56. In step S56, a button press message is transferred to a program selector 53. If the mode is set to the audio mode, the step S55 proceeds to a step S57. In step S57, the button press message is transferred to an audio player 54.

If the left or the right buttons (LB or RB) are pressed, the program selector 53 scrolls program icons PI1–PI5 displayed in the program icon display area 61 left or right. Then, the icons PI1–PI5 are displayed. If the middle button MB is pressed, a selected application program is executed. That is, a user can execute a selected program by locating an icon of an application program in the middle and pressing the middle button MB. If a user presses the middle button MB, an application program "Explorer" is executed, as shown in FIG. 6A, for example. If three application programs are registered, one-to-one correspondence between the left button LB, the middle button MB, and the right button RB and the three application programs is made to directly execute a corresponding application program by pressing a button only one time.

If there is no press of a smart button, the step S51 proceeds to a step S58. In step S58, the invention determines whether predetermined time is elapsed without pressing the smart button. If elapsed, the step S58 proceeds to a step S59. In step S59, an activated smart shell window 60 is iconized to be inactivated. If the smart buttons 25 are pressed in the inactive status, the smart shell window 60 is activated again to be displayed on a screen. When the smart buttons 25 for converting a smart shell mode is input in the active mode, the smart shell mode is changed and a corresponding audio player 54 is executed.

A "drag and drop" function using a mouse device enables an application program to be registered in the smart shell 25. That is, an icon of the application program is dragged and dropped into an application program icon display area 61 of the smart shell window 60 by using a mouse pointer, so that the application program is registered therein. Further, the application program can be registered therein by using a special menu mode.

Figure 7A:
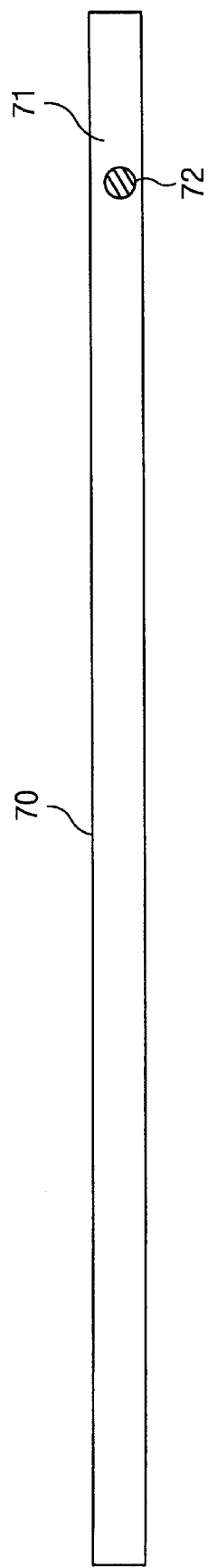
FIGS. 7A–7B illustrates a mode display icon for dividing a smart shell mode and into an audio mode displayed in a taskbar notification area.
Figure 7B:
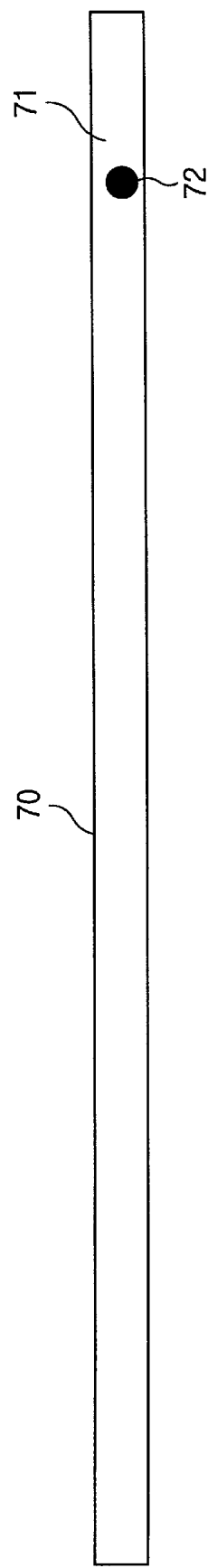

FIGS. 7A–7B illustrates a mode display icon for dividing a smart shell mode and into an audio mode displayed in a taskbar notification area. A mode of a smart shell 51 can be changed by means of a special mode converter 55. If the smart shell 51 is driven, a mode display icon 72 displaying, respectively, a smart shell mode and an audio mode is displayed in a taskbar notification area 71 of a taskbar 70, as shown in FIGS. 7A–7B. The mode display icon 72 can be displayed with colors which respectively corresponds to modes of the smart shell 51. For example, FIG. 7A and 7B show the mode display icon 72 in case of a smart shell mode and an audio mode, respectively. Each of the modes can be displayed with an icon corresponding to a mode instead of the colors. A user is able to change a mode by locating a pointer of a mouse in the mode display icon 72 and then clicking a left and a right buttons of the mouse.

Figure 8A:
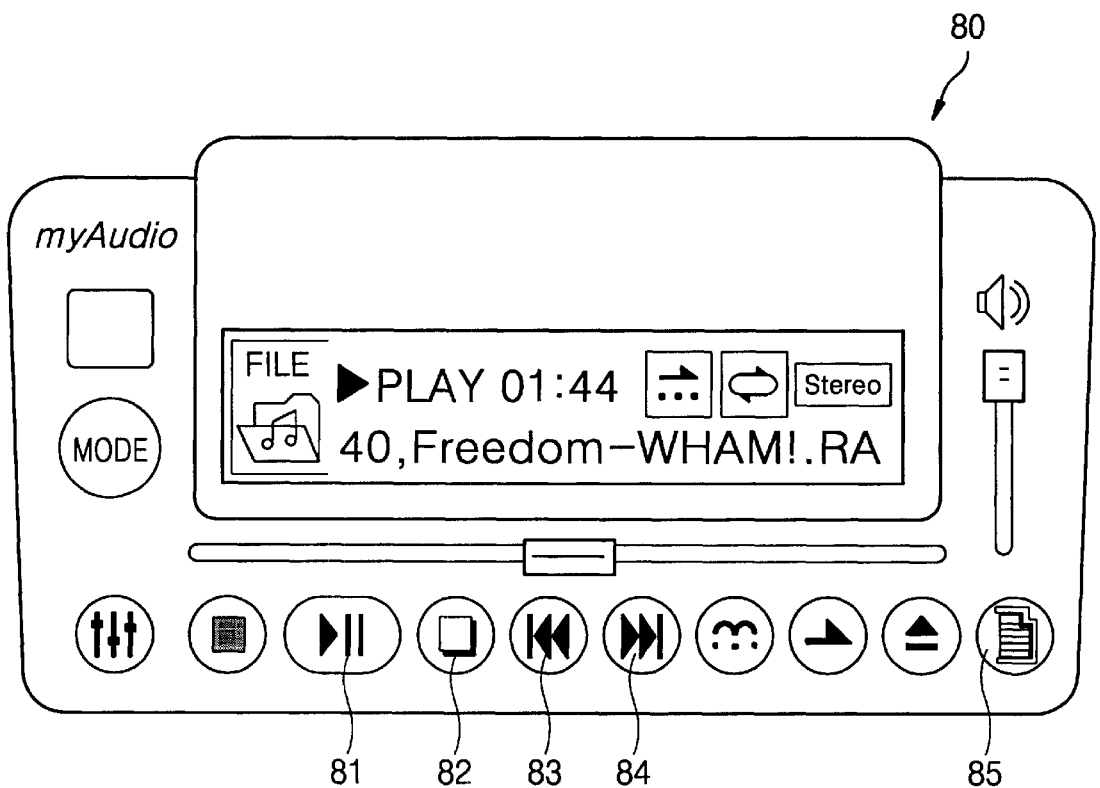
FIGS. 8A–8B illustrates an example of a window of an audio player supporting smart buttons.
Figure 8B:
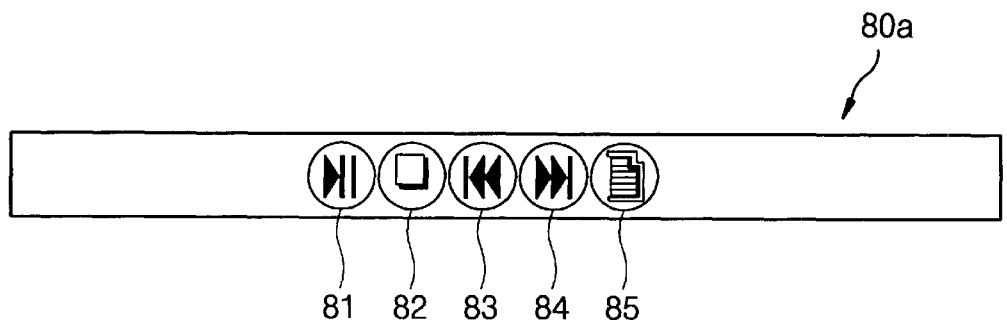

FIGS. 8A–8B illustrates an example of a window of an audio player supporting smart buttons and FIG. 9 illustrates an example of an audio album subwindow of an audio player. The audio player 54 can be controlled by using the smart buttons 25 in the audio mode. Referring to FIG. 8A, if a smart shell 51 is operated in an audio mode, an audio player 54 can be operated by smart buttons 25. When the audio player is activated, an audio player window 80 is displayed on a screen. The audio player window 80 can be minimally displayed, as shown in FIG. 8B. An audio playback control function corresponding to menu button icons 81–85, wherein button icon 81 represents a play/pause function, button icon 82 represents a stop function, button icon 83 represents a previous track selection function and button icon 84 represents a next track selection function, can be selected by using the smart buttons 25. That is, the selection is possible by correlating the menu button icons 81, 82, 83, and 84 to each of the buttons LB, MB, and RB. In this case button icon 83 corresponds to smart button LB, button icons 81 and 82 corresponds to smart button MB and button icon 84 corresponds to smart button 84, however, smart button MB alone is not used to select the pause function of button icon 81. It should be noted here that the button icons 81–85 can also be selected using a mouse as is well known in the art. When a menu button icon 85 is activated an audio album subwindow is displayed on the screen, as shown in FIG. 9. Additionally, a pause function could be implemented by using a combination of smart buttons, such as smart buttons LB and MB, and similarly the audio album subwindow could be implemented by using a combination of smart buttons RB and MB, for example.

A user can conveniently execute application programs by using a smart button in the present invention, whereas the user selects and executes application programs one by one in the prior art. In particular, the user can register an application program which can be selected by the smart button in a smart shell, thereby enabling a using environment to be fitted for the user. Since an audio player can be easily controlled by using the smart button, the user need not perform vexatious input steps for controlling the audio player using a keyboard device or a mouse.

While the invention is described in connection with the preferred embodiment, there is no intention to limit it to the embodiment. On the contrary, the intent is to cover all alternative, modifications, and equivalents included within the spirit and scope of the invention as defined by appended claims.

What is claimed is:

1. A computer user interface comprising:
    input means, including a plurality of input buttons separate and distinct from keys of a normal keyboard of a computer, for executing a selected application program installed in said computer by pressing said buttons;
    conversion means for sensing activation of one or more of said input buttons and outputting corresponding key scan codes; and means for executing said selected application program in response to said key scan codes, wherein said input means includes,
  a first button and a second button for selecting an application program; and
  a third button for commanding said selected application program to be executed, wherein said selected application program is one of a plurality of application programs registered to a smart shell program and said smart shell program is started and displayed on a screen of said computer as a smart shell window when said first, second and third buttons are activated simultaneously.

2. The computer user interface of claim 1, wherein said means for executing said application program includes,
  input decision means for sensing that said conversion means outputs said key scan code in response to said activation of said one or more buttons and to output data corresponding to said key scan code; and
  means for receiving said data from said input decision means and executing said application program installed in said computer.

3. The computer user interface of claim 2, wherein said means for executing said application program has,
  a first operation mode for executing an application program selected by said input means; and
  a second operation mode being able to select a menu of said application program by means of said input means.

4. The computer user interface of claim 3 wherein said means for executing said application program comprises,
  a program selector for executing the application program selected in said first operation mode; and
  means for supplying a message to said program selector in said first operation mode and supplying the message to the application program in said second operation mode, said message corresponding to the data being output from said input decision means.

5. The computer user interface of claim 1, wherein said selected application program is one of a plurality of application programs assigned to an application group and said application group is opened and displayed on a screen of said computer when said plurality of input buttons are activated simultaneously.

6. The computer user interface of claim 1, wherein said smart shell window comprises:
  a first display area wherein a plurality of program icons corresponding to said plurality of application programs registered to said shell pram are displayed; and
  a second display area for displaying first, second and third button icons corresponding to said first, second and third buttons.

7. The computer user interface of claim 6, wherein said third button icon displays, in text format, a label indicating the application program currently selected by said first and second buttons.

8. The computer user interface of claim 6, wherein said first and second button icons change in appearance when said first and second buttons are activated by a user.

9. The computer user interface of claim 6, further comprising:
  both said first and second display areas being viewable on said screen when said smart shell window is displayed in a maximized mode; and
  only said second display area being viewable on said screen when said smart shell window is displayed in a minimized mode.

10. The computer user interface of claim 9, wherein said third button icon displays, in text format, a label indicating the application program currently selected by said first and second buttons.

11. The computer user interface of claim 9, wherein said first and second button icons change in appearance when said first and second buttons are activated by a user.

12. The computer user interface of claim 1, wherein said smart shell program is displayed on a screen of said computer as an icon until said first, second and third buttons are activated simultaneously.

13. The computer user interface of claim 1, wherein said selected application program is an application program for controlling an audio player.

14. The computer user interface of claim 13, wherein said input means includes,
  a first button for controlling a previous track selection function of said audio player;
  a second button for controlling a next track selection function of said audio player; and
  a third button for a play function and an stop function of said audio player.

* * * * *